Sept. 23, 1952 J. W. JACOBS 2,611,275
ELECTRICAL APPARATUS
Filed April 6, 1950 4 Sheets-Sheet 1

INVENTOR.
James W Jacobs
BY
Willits, Hardman and Fehr
Attorneys

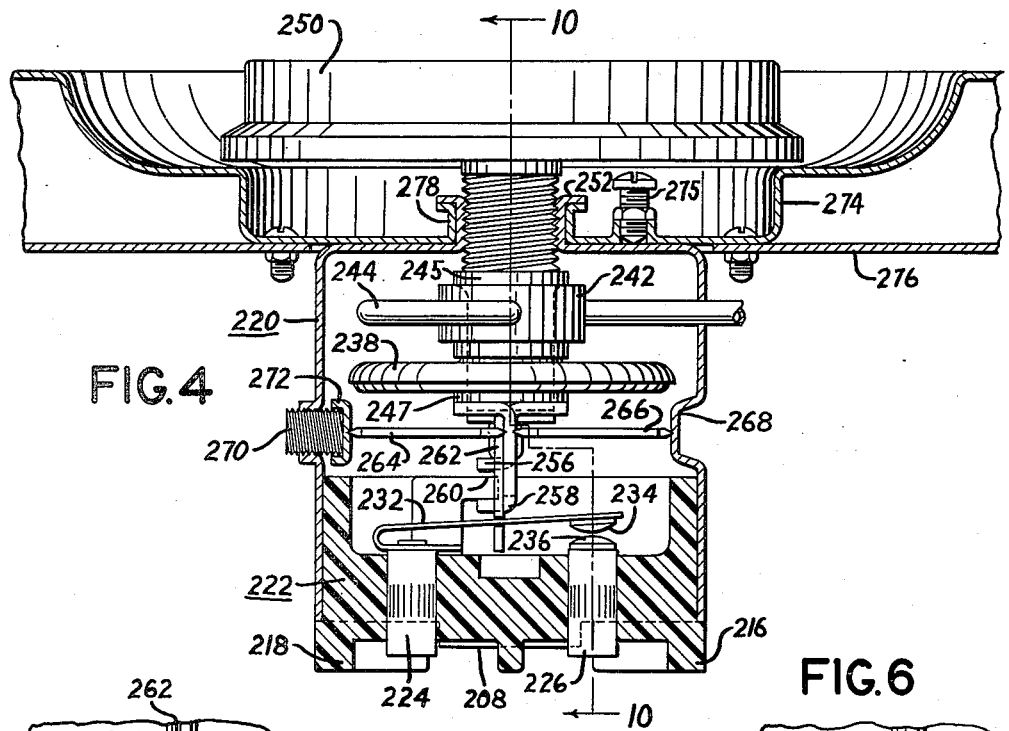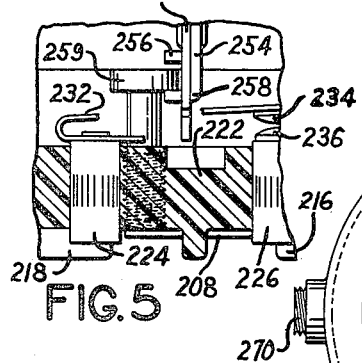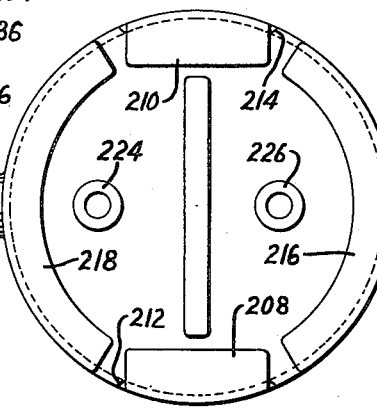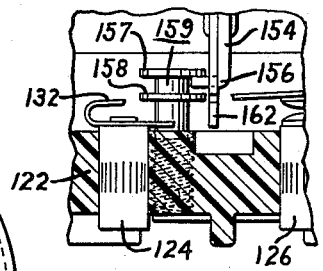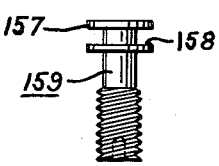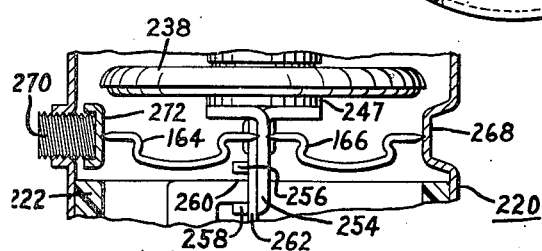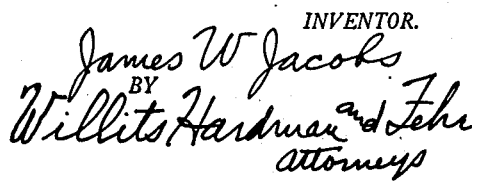

Sept. 23, 1952   J. W. JACOBS   2,611,275
ELECTRICAL APPARATUS

Filed April 6, 1950   4 Sheets-Sheet 3

INVENTOR.
James W Jacobs
BY
Willits Hardman and Fehr
Attorneys

Sept. 23, 1952  J. W. JACOBS  2,611,275
ELECTRICAL APPARATUS

Filed April 6, 1950  4 Sheets-Sheet 4

INVENTOR.
James W Jacobs
BY
Willits Hardman and John
Attorneys

Patented Sept. 23, 1952

2,611,275

UNITED STATES PATENT OFFICE 2,611,275

ELECTRICAL APPARATUS

James W. Jacobs, Dayton, Ohio, assignor to General Motors Corporation, Dayton, Ohio, a corporation of Delaware Application April 6, 1950, Serial No. 154,343

15 Claims. (Cl. 74—100)

This invention relates to controls such as switches and valves as, for example, may be used in refrigerating apparatus and other control applications.

It is an object of my invention to simplify controls and their construction and adjustment, particularly by having various parts serve a double or triple function.

It is a more specific object of my invention to use the enclosing housing of the control as a structural mounting member for supporting the various elements of the control in proper relation as well as to use this housing as a spring in the toggle action of the control.

It is another specific object of my invention to employ a single adjustable member for limiting both the opening and closing operations of the control.

It is another object of my invention to provide a user's adjustment in the form of a knob and screw and to make use of this as a factory and service adjustment by bodily rotating or turning the control on this same axis.

Further objects and advantages will be apparent from the following description, reference being had to the accompanying drawings, wherein a preferred form of the present invention is clearly shown.

In the drawings:

Fig. 4 is a vertical sectional view through a preferred form of the invention which differs from Fig. 1 in an arrangement of the capillary tube and in the mounting structure;

Fig. 5 is a fragmentary view showing a modified form of limiting adjustment for the control shown in Figs. 1 and 4;

Fig. 6 is another fragmentary view showing another modified form of limiting adjustment for the control shown in Figs. 1 and 4;

Fig. 7 is a view in elevation of the adjustment screw shown in Fig. 6;

Fig. 8 is a bottom view of Fig. 4 which serves also as a bottom view for Fig. 1;

Fig. 9 is a fragmentary view showing a modified form of the toggle members shown in Figs. 1 and 4;

Figure 1:
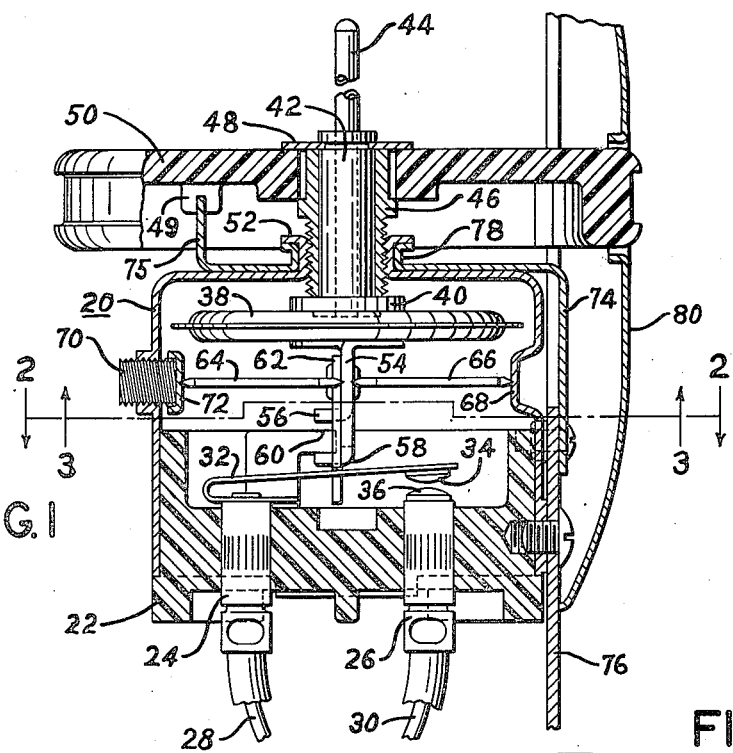
Fig. 1 is a vertical sectional view through one form of control and its mounting embodying my invention.

Referring to the drawings and more particularly to Fig. 1, there is shown a cup-shaped housing structure 20. Within the open end of this housing structure 20 there is provided a terminal support member 22 formed of a thermo-plastic electrical insulating material having the electrical terminals 24 and 26 molded therein connected by the conductors 28 and 30 to any suitable electrical apparatus, such as an electric motor which may be used to drive a refrigerant compressor. Riveted to the inner end of the terminal 24 is a leaf spring member 32 carrying at its free end an electrical contact 34 adapted to make and break contact with a similar contact 36 provided on the top of the terminal 26.

An actuating means in the form of a hollow thin metal double diaphragm structure 38 is provided within the opposite end of the housing structure 20 for opening and closing the contacts 34 and 36. This diaphragm structure 38 has its upper face bonded to the flange 40 provided at the lower end of a hollow sleeve 42 which connects to a capillary tube 44. The external surface of the sleeve 42 serves as a bearing for a threaded sleeve 46 which is held in place on the sleeve 42 by a C-shaped ring 48 which fits into an annular groove at the upper end of the sleeve 42. The threaded sleeve 46 is provided with a splined upper end which receives an adjusting knob 50 likewise held in place by the C-shaped ring. The threaded sleeve 46 threads through a threaded flanged aperture 52 which is extruded from the upper crossed end of the housing structure 20. In this way the diaphragm structure 38 is adjustably supported.

The lower face of the diaphragm structure 38 is bonded to the laterally turned arms of a metal member 54 having two additional projections 56 and 58 struck out therefrom. These projections cooperate with a projection 60 molded as an integral part of the electrical insulating terminal support member 22 to limit the movement of the member 54 in the opening and closing movements thereof. This arrangement also limits the expansion and contraction of the diaphragm structure 38 to prevent excessive strain and stress in all the portions thereof. Riveted to this metal member 54 is a connecting member 62 of some suitable electrical insulating material, such as a thermo-plastic or thermo-setting material. This member 62 has a narrow slot therein which engages the leaf spring 32 to operate the movable contact 34 to closed and open positions.

To cause the contact 34 to be operated with a snap-action in the opening and closing movement, there are provided a pair of rigid toggle members 64 and 66 having their inner ends pivotally connected through the use of knife edges and notches with the metal member 54 which is bonded to the lower face of the diaphragm structure 38. The cup-shaped housing structure 20 in its cylindrical portion has an inturned boss 68 provided with a notch to provide a pivotal connection with the knife edge on the outer end of the toggle member 66. The opposite side of the cylindrical portion of the housing structure 20 has an extruded threaded aperture receiving an adjusting screw 70 provided with a rotatably mounted cap 72 on its inner end having a notch for providing a pivotal connection with the knife edge on the outer end of the toggle member 64.

The cup-shaped housing structure 20 is preferably formed of a resilient metal, such as steel, preferably stainless steel or spring brass or copper. The toggle members 64 and 66 are column loaded by adjustment of the adjusting screw to the proper amount so that the cylindrical wall portions of the cup-shaped housing structure 20 are distorted slightly and form a cylindrical spring which serves as the toggle spring for the toggle members 64 and 66. The amount of distortion required of the housing to serve as a spring for the toggle members is quite small and does not disturb the accuracy of the control. If, however, it is desired to make the cup-shaped housing structure rigid the toggle members may be made with a C-shaped section, as shown by the toggle members 164 and 166 in Fig. 9. By placing the C-shaped section in these toggle members the toggle members are made resilient to include spring action and the housing structure may then be made rigid.

In Fig. 1, the cup-shaped housing structure 20 is rotatably supported by an L-shaped bracket 74, the lower end of which is fastened to a metal wall member 76. This L-shaped bracket is provided with a flanged aperture 78 which surrounds and serves as a bearing for the extruded threaded aperture 52 of the housing structure 20, which is spun over the flanged aperture 78 of the bracket 74.

By this construction, the switch may be properly set by adjustment of the sleeve 46 within the flanged aperture 52. The knob 50 may then be placed on the sleeve in the proper relationship to obtain the desired operation of the control at the particular knob setting in relation to the temperature of the capillary tube. The capillary tube may be charged with a suitable volatile liquid or gas or it may be provided with a thermally expansible liquid. As mentioned before, the C-shaped ring 48 holds the knob 50 and the sleeve 46 in place. The L-shaped bracket 74 has an upturned projection 75 which cooperates with the downwardly extending projection 49 upon the knob to limit the knob to one revolution of movement. Any further adjustments may be made by bodily rotating the entire housing structure consisting of the cup-shaped housing member 20 and the electrical insulating terminal support member 22 relative to the L-shaped bracket 74. An escutcheon plate 80 is provided to cover an opening in the wall member 76 through which access to the control is obtained. The rim of the knob 50 extends through an opening in the escutcheon plate 80 for finger manipulation to provide a limited temperature selection by the user.

Figure 10:
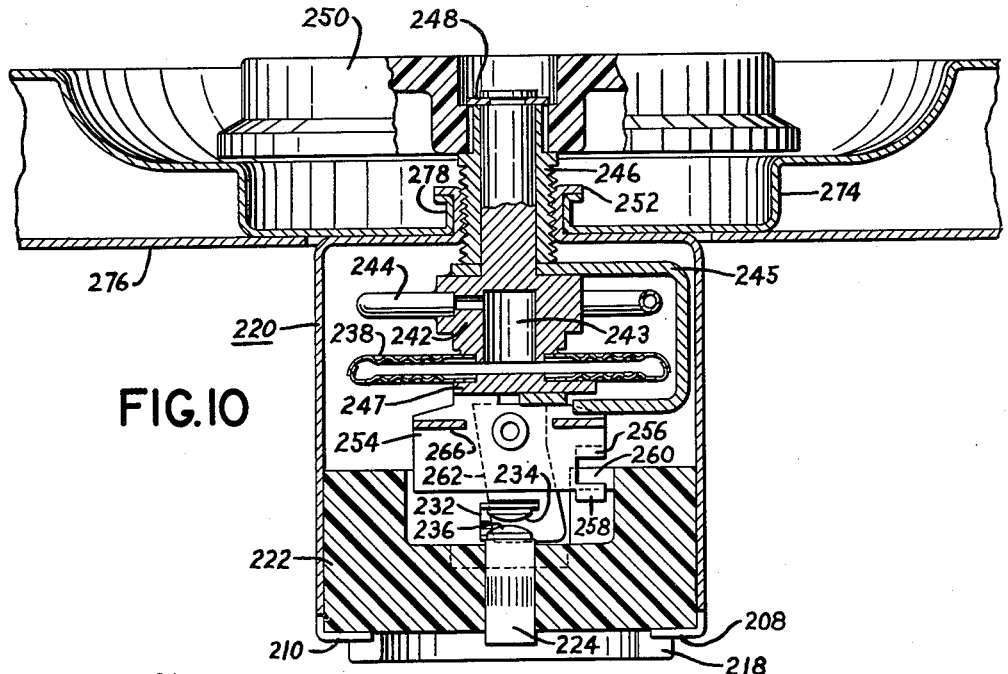
Fig. 10 is a sectional view taken along the lines 10—10 of Fig. 4.

In Figs. 4, 8 and 10 there is shown a preferred form of the invention. In this form there is also provided a resilient cup-shaped housing structure 220. Within the open end of this housing structure is a terminal supporting member 222 of electrical insulating material. This terminal supporting structure 222 is substanttially identical to the terminal supporting structure and assembly shown in Fig. 1. They are both fastened to their respective cup-shaped housing supports in a similar manner. This is better illustrated in Figs. 8 and 10. The electrical terminal supporting structure 222 is provided with opposite flanges 218 and 216 which include shoulders against which are lodged opposite notched portions on the rim of the cup-shaped housing structure 220. The terminal supporting structure 222 is provided on opposite sides with grooves or notches 214 and 212 through which extend the tongues 210 and 208 provided upon the rim of the cup-shaped structure 220. These tongues 210 and 208 are bent over, as shown in Figs. 8 and 10, to firmly hold the shoulders 216 and 218 in place against the notched rim of the cup-shaped housing structure 220 to firmly lock the terminal supporting structure 222 to the cup-shaped housing structure 220 to provide a complete closing housing for the operating parts of the control.

The terminal support 222 has molded in it the terminal members 224 and 226 extending completely through the structure from top to bottom. The lower ends of these terminals are threaded so that electrical conductors may be fastened thereto by suitable binding screws. To the upper end of the terminal 224 there is riveted a leaf spring member 232 which is similar to the member 32 in Fig. 1. At its free end it is provided with a contact 234 adapted to move into and out of contact with the contact 236 provided on top of the terminal member 226.

In Figs. 4 and 10 the actuating diaphragm structure 238 has its upper face fastened to a pin 242 provided with passages 243 connecting the interior of the diaphragm structure 238 with the capillary tube 244 which, after making a 270 degree turn passes out through an aperture in the wall of the cup-shaped housing structure 220 so that it may be exposed to the temperature which is desired to be used to control the operation of the contacts 234 and 236. Bonded to the head of the pin 242 a U-shaped member 245 which extends around the capillary tube and the diaphragm structure 238 and has its lower arm extending beneath a pad 247 on the lower face of the diaphragm structure 238. The upper end of the pin 242 provides a bearing for the externally threaded bushing 246 which, like the bushing 46, is threaded into the extruded flanged aperture 252 of the cup-shaped housing structure 220. This aperture 252 is internally threaded. The threaded bushing 246 also has a splined portion which receives the adjusting knob 250 held in place by a C-shaped ring 248 which holds the bushing 246 in proper axial position.

The pad 247 on the lower face of the diaphragm structure 238 is provided with a metal follower member 254 provided with projecting tongues 256 and 258 which are struck out from the main portion in a manner similar to the tongues 56 and 58 in Fig. 1. These tongues 256 and 258 engage the upper and lower faces of the projection 260 which is molded as an integral part of the terminal supporting member 222. Through the interengagement of the projection 260 with the projecting tongues 256 and 258, the movement of the follower member 254 is limited so as to limit the movement of the contact 234 as desired, and to limit the stresses upon the diaphragm structure 238. The follower member 254 is riveted to a connecting member 262 of electrical insulating material having a narrow notch at its lower end which firmly hooks the leaf spring member 232 to operate the contacts 234 and 236.

Figures 2, 3:
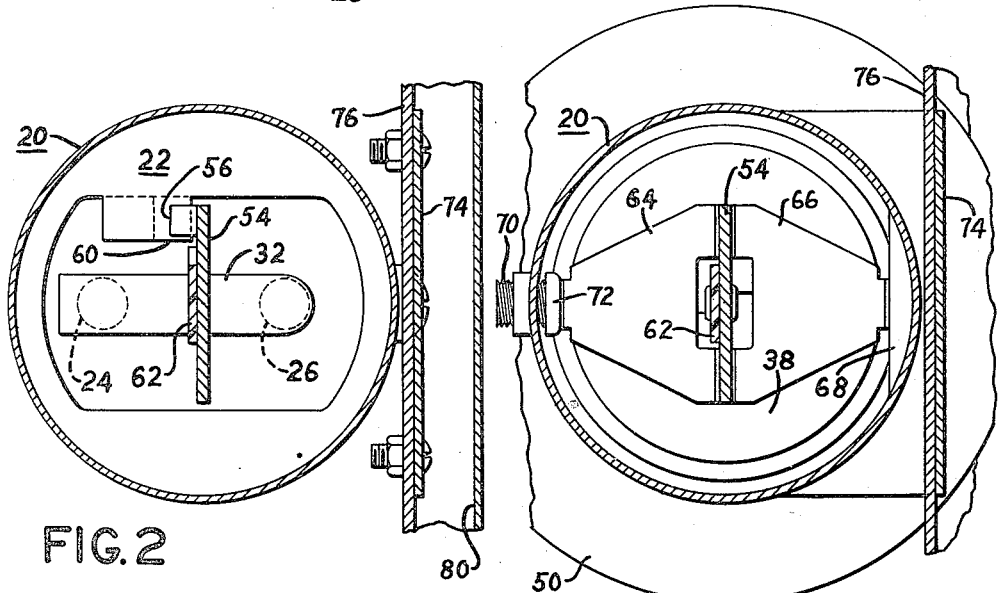
Fig. 2 is a sectional view taken along the line 2—2 of Fig. 1.
Fig. 3 is a sectional view taken along the line 3—3 of Fig. 1.

Pivotally connected to the follower member 254 are the toggle members 264 and 266 which are similar to the toggle members 64 and 66 as shown in Fig. 3. In a manner similar to the cup-shaped housing structure 20 in Fig. 1 the cup-shaped housing structure 220 in Figs. 4 and 10 is provided with an inwardly turned boss 268 provided with a notch for pivotally connecting with a knife edge on the outer end of the toggle member 266. On the opposite side of the cup-shaped housing structure 220 there is provided an adjusting screw 270 which threads through an extruded threaded aperture in the cylindrical wall portion of the structure. This screw 270 is provided with an inner cap 272 rotatably mounted thereon provided with a notch to provide a pivotal connection with a knife edge on the outer edge of the toggle member 264. The cup-shaped housing structure 220 is made of a suitable resilient metal such as steel, preferably stainless steel, or spring brass or copper, so that it may serve as a spring for the toggle members 264 and 266 when it is distorted. The adjusting screw 270 is adjusted so as to apply column loading to the toggle members 264 and 266 so that the contacts 234 and 236 will move to open and closed positions according to the movement of the follower member 254 as limited by the projecting tongues 256 and 258. If it is desired to make the cup-shaped housing structure 220 rigid and non-resilient, the resilient toggle members 164 and 166, shown in Fig. 9 may be substituted for the rigid toggle members 264 and 266.

The control may be adjusted in the factory by turning the externally threaded sleeve 246 to the proper point to give the desired relationship between the pressure within the actuating diaphragm structure 238 and the opening and closing of the contacts 234 and 236. The knob 250 is then mounted thereon in the desired relationship to the orientation of the housing structure. The knob 250 provides a limited temperature selection by the user. When the knob 250 is rotated so that the hollow screw 246 is turned to its outermost position, the yoke 245 engages the pad 247 to positively hold the contact 234 in its open position. Further adjustment of the control may be made by bodily rotating the housing structure 220 relative to its mounting member 274 which is provided with a flanged aperture 278 forming a bearing surrounding the threaded flanged aperture 252 of the cup-shaped housing member 220. The mounting member 274 is provided with a set-screw 275 and a lock-nut for holding the cup-shaped housing structure 220 in any desired position of rotation. The mounting member 274 is fastened over an aperture in the supporting wall 276 to support the control.

If further adjustment is desired, a large headed screw designated by the reference character 259 in Fig. 5, may be substituted for the projection 260 or 60 which are shown molded in their respective contact supports in Figs. 1, 4 and 10. This large headed adjusting screw has its head located substantially in the same position as the projections 60 and 260, but has its shank threaded through contact support structure so that it may be adjusted from outside the housing to simultaneously adjust both the open and closed positions of the contact member 232.

If this arrangement is not sufficiently accurate, the arrangements shown in Figs. 6 and 7 may be used. In this arrangement only a single projection 156 is struck out from the follower member 154 corresponding to the follower members of 54 and 254 in Figs. 1 and 4. A double headed screw 159 threads entirely through the contact support 122 which is otherwise similar to the contact supports 220 and 222 in Fig. 4. This double headed screw provides two annular shoulders 157 and 158 between which the projection 156 operates. Since the screw 159 may be made quite accurately, the distance between the shoulders 157 and 158 is constant and the movement allowed the projection 156 is always the same. The screw 159 may be rotated to move it upwardly or downwardly to accurately position the limit of movement of the projection 156. The projection 156 through its connection with the diaphragm actuating structure 238 and the contact 234 limits the entire operating movement of the operating members of the control arrangement.

Figure 11:
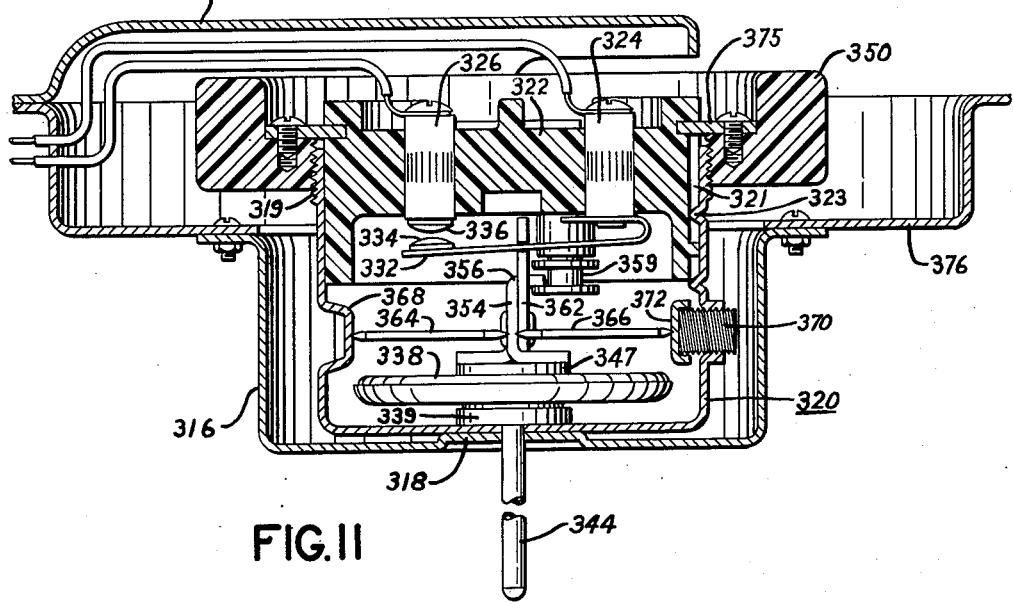
Fig. 11 is a sectional view of another modified form of control.

In Fig. 11 there is shown another form of the invention employing a resilient cup-shaped housing structure 320. This closed end of the cup-shaped housing structure 320 is bonded by spot-welding or other form of bonding to a boss 318 upon the mounting member 316. A capillary tube 344 extends through apertures in the boss 318 and the cup-shaped housing structure 220 to connect with the interior of the actuating diaphragm structure 338.

The actuating diaphragm structure 338 is provided with a pad 347 connecting directly with the follower member 354. The follower member 354 is pivotally connected to the inner ends of the toggle members 364 and 366 which are similar to the toggle members 64 and 66 in Fig. 3. If desired, the toggle members 164 and 166 may be substituted for the toggle members 364 and 366. The outer end of the toggle member 264 is pivotally connected to an in-turned boss 368 provided in the cylindrical wall portion of the cup-shaped housing structure 320. The pivotal connection is made through a notch in the boss 368 and the knife edge on the outer end of the toggle member 364. The outer end of the toggle member 366 is pivotally connected through a knife edge and notch with a cap member 372 rotatably mounted upon the inner end of the adjusting screw 370 held within the threaded flanged aperture in the cylindrical wall portion of the cup-shaped housing structure 320. This screw 370 is adjusted to apply a column load to the toggle members 364 and 366 to cause the follower 354 to operate with a snap action.

The follower member 354 is provided with a single projection 356 like the projection 156 shown in Fig. 6. This projection operates between the shoulders of a double headed screw 359 which is similar to the screw 159 shown in Fig. 7. This screw 359 threads through the terminal supporting member 322 which is slidably mounted within the open end of the cup-shaped housing structure 320. This terminal supporting member 322 is provided with an external groove 321 into which projects a projection 323 projecting inwardly from the cup-shaped housing structure 320 to prevent relative rotation between the contact support 322 and the housing structure 320 but permitting the contact structure to be slid in and out of the housing structure 320.

The terminal supporting member 322 is provided with the terminal members 324 and 326 molded therein. The terminal member 324 carries the leaf spring member 332 connected by the connecting member 362 of the electrical insulating material with the follower member 354 as in the other modification. The contact member 332 carries the movable contact 334 adapted to move into contact with the stationary contact 336 provided upon the inner end of the terminal member 326.

In this modification the contact member 322 is provided with an annular notch which receives a C-shaped member 375 which is rotatably mounted thereon. This C-shaped member 375 is fastened by screws to an annular adjusting knob 350 which is internally threaded. The internal threads of the knob 350 thread upon the external threads 319 which are provided upon the rim of the cup-shaped housing structure 320. When the knob 350 is rotated, the terminal supporting member 322 is bodily moved relative to the cup-shaped housing structure 320 and the actuating diaphragm structure 338 to adjust the operation of the movable contact 334 relative to the pressure within the actuating diaphragm structure 338. The mounting member 316 is mounted upon a wall 376 having an aperture for receiving the control. A cover 380 is provided for covering the terminals 324 and 326 and the electrical connections and conductors.

Figure 12:
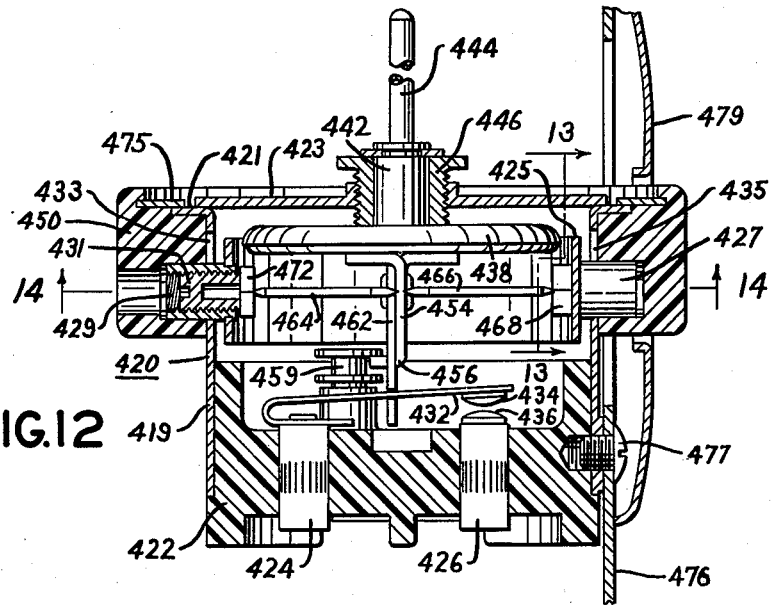
Fig. 12 is a sectional view of another modified form of control.
Figure 13:
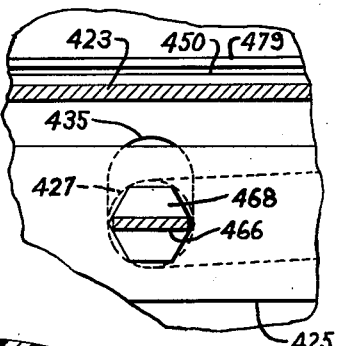
Fig. 13 is a fragmentary sectional view taken along the line 13—13 of Fig. 12.
Figure 14:
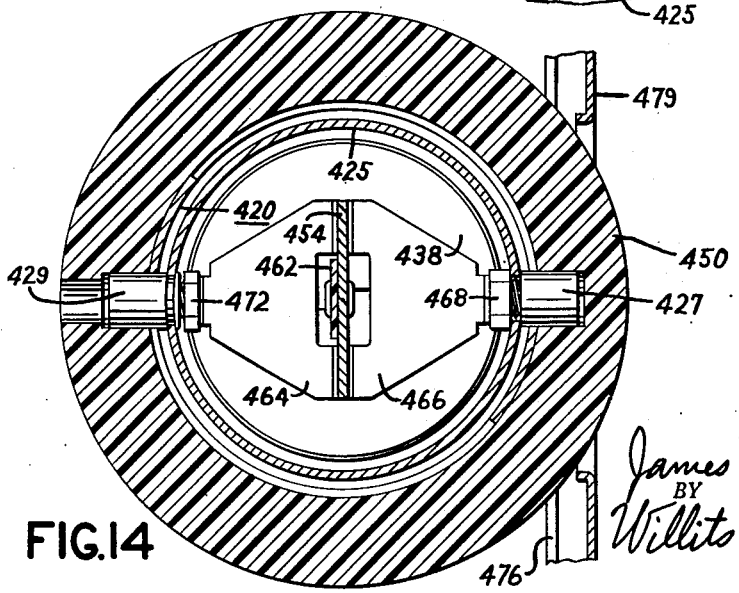
Fig. 14 is a sectional view taken along the line 14—14 of Fig. 12.

In the form shown in Figs. 12 to 14, the terminal supporting member 422 is similar to that shown in Fig. 6. The cup-shaped housing structure 420 however, is made in two parts which are bonded together. One part is in the form of a cylindrical member 419 provided with out-turned flanges 421. Fastened to these flanges 421 by some form of bonding means is the second part in the form of a thin metal disc 423 having a flanged threaded aperture which receives a threaded bushing 446. This threaded bushing 446 is rotatably mounted upon the hollow sleeve 442. On the lower end of this hollow sleeve 442 there is fastened an actuating diaphragm structure 438. The sleeve 442 is provided with a capillary tube 444 which communicates with the interior of the actuating diaphragm structure 438. The lower face of the diaphragm structure 438 is provided with a follower member 454 provided with a projection 456 extending in between the shoulders of the double headed screw 459 threaded into the terminal support 422. The terminal support 422 has molded therein the terminal members 424 and 426 to which the electrical conductors are attached. The leaf spring member 432 is riveted to the terminal 424 and is provided with a movable contact 434 which engages and disengages the stationary contact 436 on top of the terminal 426. The follower member 454 is connected by the connecting member 462 with the leaf spring contact member 432 to actuate the movable contact 434 in accordance with the expansion and contraction of the diaphragm structure 438 within the limits permitted by the projection 456.

In this modification there is provided a separate resilient cylindrical ring 425 within the cup-shaped housing member 420. Upon opposite sides this ring 425 are riveted the bearing members 427 and 429. The bearing member 427 is provided with a rotatable pin 468. The head of this pin 468 has a pivotal connection with the outer end of the toggle member 466. The bearing member 429 is internally threaded and carries therein an adjusting screw 431 which in turn receives a pin 472. The head of this pin 472 similarly has a pivotal connection with the outer end of the toggle member 464. The inner ends of the toggle members make pivotal connections with the follower member 454 through the familiar knife edge and notched construction.

The bearing members 429, 427 extend through vertical elongated apertures 433, 435 in the cylindrical wall portions of the cup-shaped housing structure 420. The bearing members 427 and 429 are also guided by inclined slots in an adjusting knob 450. The adjusting knob 450 is rotatably mounted upon the flange of the cup-shaped housing member 420 by a C-shaped ring 475. By this arrangement the cylindrical ring 425 may be rotated to cam the bearing members 427 and 429 closely to or further away from the terminal support 422. This shifts the cylindrical ring 425 in a like manner to adjust the operation of the toggle members 464 and 466 in a manner to change the relationship between the pressure within the actuating diaphragm structure 438 and the operation of the movable contact 434. The toggle members 464 and 466 are provided with a column loading by suitably adjusting the screw 431 so as to slightly distort the cylindrical ring 425. The position of the actuating means proper may be adjusted by turning the externally threaded sleeve 436. The limits of movement may be adjusted by turning the double headed screw 459. The cup-shaped housing member 420 is fastened to the supporting wall 476 by the screw 477. The knob 450 projects through the aperture in the escutcheon plate 479.

A control of the type shown in any of the modifications disclosed herein may be made much smaller than the illustrations disclosed in the drawings. The knife edge construction of the toggle members may be made of hardened metal so that there is little wear and friction is reduced thereby, so that the control may be made very accurate. The parts are few in number and serve many functions so that the control is simple and inexpensive.

While the form of embodiment of the invention as herein disclosed, constitutes a preferred form, it is to be understood that other forms might be adopted, as may come within the scope of the claims which follow.

What is claimed is as follows:

1. A control arrangement including a support means, a control means and an actuating means operably connected together and mounted upon the support means, an adjusting screw threaded into the support means, said adjusting screw having a pair of spaced annular shoulders, said actuating means being provided with a projection extending in between said spaced annular shoulders for limiting the operation of the control means.

2. A control arrangement including a support means, a control means and an actuating means operably connected together and mounted upon the support means, an adjusting screw threaded into the support means, said adjusting screw having a pair of spaced annular shoulders, said actuating means being provided with a projection extending in betwen said spaced annular shoulders for limiting the operation of the control means, and an adjusting means for adjusting the location of the actuating means.

3. A control arrangement including a support means, a control means and an actuating means operably connected together and mounted upon the support means, an adjusting screw threaded into the support means, said adjusting screw having a pair of spaced annular shoulders, said actuating means being provided with a projection extending in between said spaced annular shoulders for limiting the operation of the control means, and a toggle means acting upon the actuating means for controlling the operation of the control means.

4. A control arrangement including a cup-shaped structure, a diaphragm means mounted in one end portion of the cup-shaped structure, a control means mounted in the other end portion of the cup-shaped structure, said diaphragm means being operatively connected to said control means, a set of two toggle members each having their inner end portions pivotally connected to said actuating means, the opposite wall portions of said cup-shaped structure being provided with pivotal supports for pivotally supporting the outer ends of said toggle members, one of said pivotal supports including a threaded adjusting means threaded through the wall of said cup-shaped structure.

5. A control arrangement including a cup-shaped structure, a diaphragm means mounted in one end portion of the cup-shaped structure, a control means mounted in the other end portion of the cup-shaped structure, said diaphragm means being operatively connected to said control means, a set of two toggle members each having their inner end portions pivotally connected to said actuating means, the opposite wall portions of said cup-shaped structure being provided with pivotal supports for pivotally supporting the outer ends of said toggle members, said cup-shaped structure being resilient to apply a resilient column loading upon the toggle members.

6. A control arrangement including a support means, a control means and an actuating means connected together and mounted upon the support means, an adjusting means operating upon said actuating means for adjusting the relationship between the force of the actuating means and the operation of the control means, a rotatable knob for operating said adjusting means, and a mounting means provided with a rotatable mounting for supporting said supporting means upon an axis coaxial with the axis of said rotatable knob.

7. A control arrangement including a support means, a control means and an actuating means connected together and mounted upon the support means, an adjusting means operating upon said actuating means for adjusting the relationship between the force of the actuating means and the operation of the control means, a rotatable knob for operating said adjusting means, a mounting means provided with a rotatable mounting for supporting said support means upon an axis coaxial with the axis of said rotatable knob, and releasable means for releasably locking the support means relative to the mounting means.

8. A control arrangement including a cup-shaped structure, a diaphragm means mounted in one end portion of the cup-shaped structure, a control means mounted in the other end portion of the cup-shaped structure, said diaphragm means being operatively connected to said control means, a set of two toggle members each having their inner end portions pivotally connected to said actuating means, the opposite wall portions of said cup-shaped structure being provided with pivotal supports for pivotally supporting the outer ends of said toggle members, one of said toggle members being resilient to provide a resilient column loading.

9. A control arrangement including a support means, a control means and an actuating means connected together and mounted upon the support means, an adjusting means operating upon said actuating means for adjusting the relationship between the force of the actuating means and the operation of the control means, a rotatable knob for operating said adjusting means, a mounting means provided with a rotatable mounting for supporting said support means upon an axis coaxial with the axis of said rotatable knob, said actuating means being in the form of a flexible diaphragm means having a coaxially arranged tubing connected thereto and extending therefrom, said adjusting means and said knob having a coaxially located aperture through which extends the tubing.

10. A control arrangement including a support means, an actuating means mounted in one portion of the support means, a control means mounted upon another portion of the support means operatively connected to the actuating means, a set of toggle members having their inner ends pivotally connected to the actuating means, a distortable resilient ring-shaped member pivotally connected to the outer ends of said toggle members to cause the control means to be operated with a snap action, said ring-shaped member being supported by the support means.

11. A control arrangement including a support means, an actuating means mounted in one portion of the support means, a control means mounted upon another portion of the support means operatively connected to the actuating means, a set of toggle members having their inner ends pivotally connected to the actuating means, a distortable resilient ring-shaped member pivotally connected to the outer ends of said toggle members to cause the control means to be operated with a snap action, and means for adjusting the location of the ring-shaped member relative to the support means.

12. A control arrangement including a support means, an actuating means mounted in one portion of the support means, a control means mounted upon another portion of the support means operatively connected to the actuating means, a set of toggle members having their inner ends pivotally connected to the actuating means, said support means including a distortable resilient cylindrical-shaped portion, the outer ends of said toggle members being pivotally connected to said cylindrical-shaped portion to cause the control means to be operated with a snap action.

13. A control arrangement including a support means, an actuating means mounted in one portion of the support means, a control means mounted upon another portion of the support means operatively connected to the actuating means, a set of toggle members having their inner ends pivotally connected to the actuating means, said support means being in the form of a housing structure enclosing said actuating means and said control means and said toggle members, the outer ends of said toggle members being pivotally connected to said housing structure, said housing structure having resilient distortable portions adjacent the pivotal connection with said toggle members.

14. A control arrangement including a support means, an actuating means mounted in one portion of the support means, a control means mounted upon another portion of the support means operatively connected to the actuating means, a set of toggle members having their inner ends pivotally connected to the actuating means, said support means being in the form of a housing structure enclosing said actuating means and said control means and said toggle members, the outer ends of said toggle members being pivotally connected to said housing structure, said toggle members being resilient.

15. A control arrangement including a support means, an actuating means mounted in one portion of the support means, a control means mounted upon another portion of the support means operatively connected to the actuating means, a set of toggle members having their inner ends pivotally connected to the actuating means, said support means being in the form of a housing structure enclosing said actuating means and said control means and said toggle members, the outer end of one of said toggle members being pivotally connected to said housing structure, a wall portion of said housing structure being provided with a notch pivotally receiving the outer end of another of said toggle members.

JAMES W. JACOBS.

REFERENCES CITED

The following references are of record in the file of this patent:

UNITED STATES PATENTS

| Number | Name | Date |
|---|---|---|
| 1,861,046 | Bower | May 31, 1932 |
| 2,096,709 | Dunn | Oct. 26, 1937 |
| 2,493,323 | Simson | Jan. 3, 1950 |